United States Patent
Coletrane et al.

(10) Patent No.: US 9,390,048 B2
(45) Date of Patent: Jul. 12, 2016

(54) CONTROLLING CHARACTERISTIC IMPEDANCE OF A TRACE IN A PRINTED CIRCUIT BOARD TO COMPENSATE FOR EXTERNAL COMPONENT LOADING

(71) Applicant: Lenovo Enterprise Solutions (Singapore) Pte. Ltd., Singapore (SG)

(72) Inventors: Candice L. Coletrane, Durham, NC (US); Sasa Cvijetic, Raleigh, NC (US); Bradley D. Herrman, Cary, NC (US); Shanay S. Kinds, Cary, NC (US); Pravin S. Patel, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 330 days.

(21) Appl. No.: 14/096,519

(22) Filed: Dec. 4, 2013

(65) Prior Publication Data

US 2015/0154140 A1    Jun. 4, 2015

(51) Int. Cl.
*H05K 7/10* (2006.01)
*H01L 21/3205* (2006.01)
*H01L 21/4763* (2006.01)
(Continued)

(52) U.S. Cl.
CPC .................................. *G06F 13/4086* (2013.01)

(58) Field of Classification Search
CPC ................. H01L 2924/00; H01L 2224/48465; G11C 5/025; H05K 2201/09709; H05K 1/025; H05K 1/0218; H05K 1/0219; H05K 1/0298
USPC ............................. 710/301; 438/586; 174/250
See application file for complete search history.

(56) References Cited

U.S. PATENT DOCUMENTS

| 6,181,571 B1 * | 1/2001 | Sugimoto | H05K 1/023 174/250 |
| 8,351,874 B2 | 1/2013 | Dent et al. | |
| 2003/0156443 A1 * | 8/2003 | Moriarty | G11C 5/04 365/63 |

(Continued)

FOREIGN PATENT DOCUMENTS

| JP | 2001144510 | 5/2001 |
| WO | WO2008050181 A1 | 5/2008 |

OTHER PUBLICATIONS

Jeong, Hyeong Tae et al. "Tunable impedance transformer using a transmission line with variable characteristic impedance." Microwave Theory and Techniques, IEEE Transactions on 53, No. 8, Aug. 2005, pp. 2587-2593.

(Continued)

*Primary Examiner* — Faisal M Zaman
(74) *Attorney, Agent, or Firm* — Katherine S. Brown; Jeffrey L. Streets

(57) ABSTRACT

A control circuit is provided on a printed circuit board to detect the presence of a memory module installed in at least one of a plurality of memory module connectors, wherein installation of the memory module is known to cause impedance to decrease in a segment of a daisy chain memory circuit. The impedance of a first signal conductor of the daisy chain memory circuit is automatically altered to reduce a mismatch in impedance between the first signal conductor and the segment in response to detecting the presence of the memory module in the connector. A metal element is incorporated into the printed circuit board a spaced distance from the first signal conductor, and the control circuit may selectively activate one or more relays to cause the metal element to function as either a floating trace or a ground reference.

11 Claims, 6 Drawing Sheets

(51) Int. Cl.
*H05K 1/00* (2006.01)
*G06F 13/40* (2006.01)

(56) References Cited

U.S. PATENT DOCUMENTS

| | | | | |
|---|---|---|---|---|
| 2004/0071040 | A1* | 4/2004 | Funaba | G11C 5/04 365/232 |
| 2004/0251929 | A1* | 12/2004 | Pax | G11C 5/025 326/30 |
| 2005/0041504 | A1* | 2/2005 | Perego | G06F 13/1673 365/222 |
| 2005/0052912 | A1* | 3/2005 | Cogdill | G06F 13/4086 365/202 |
| 2005/0068751 | A1 | 3/2005 | Kim et al. | |
| 2005/0146390 | A1* | 7/2005 | Baek | H01P 5/02 333/33 |
| 2006/0022310 | A1* | 2/2006 | Egitto | B82Y 10/00 257/642 |
| 2006/0077731 | A1* | 4/2006 | Ware | G11C 5/04 365/194 |
| 2008/0080261 | A1* | 4/2008 | Shaeffer | G11C 5/025 365/189.05 |
| 2009/0016124 | A1* | 1/2009 | Kim | G11C 7/1078 365/194 |
| 2009/0231065 | A1 | 9/2009 | Cheng et al. | |
| 2009/0253385 | A1 | 10/2009 | Dent et al. | |
| 2009/0313410 | A1* | 12/2009 | Jeong | G06F 13/4086 710/300 |
| 2010/0026393 | A1 | 2/2010 | Keerti et al. | |
| 2014/0146506 | A1* | 5/2014 | Miwa | H01L 23/66 361/783 |

OTHER PUBLICATIONS

Mbairi, Felix D. et al; "On the problem of using guard traces for high frequency differential lines crosstalk reduction." Components and Packaging Technologies, IEEE Transactions on 30, No. 1, Mar. 2007, pp. 67-74.

* cited by examiner

| Metal Element Disposition | Distance (μm) | Signal Conductor L(h/m/c(f/m) | Impedance Z0 (ohms) | % Change in Z0 (From 36.89 ohms) |
|---|---|---|---|---|
| Reference |  | 2.55E-07<br>1.87E-10 | 36.89 | N/A |
| Reference | 300 | 2.52E-07<br>1.90E-10 | 36.41 | 1.3% |
| Floating | 300 | 2.55E-07<br>1.88E-10 | 36.79 | 0.3% |
| Reference | 250 | 2.45E-07<br>1.95E-10 | 35.41 | 4.0% |
| Floating | 250 | 2.54E-07<br>1.88E-10 | 36.75 | 0.4% |
| Reference | 200 | 2.33E-07<br>2.05E-10 | 33.75 | 8.5% |
| Floating | 200 | 2.53E-07<br>1.89E-10 | 36.60 | 0.8% |
| Reference | 150 | 2.13E-07<br>2.24E-10 | 30.84 | 16.4% |
| Floating | 150 | 2.52E-07<br>1.90E-10 | 36.48 | 1.1% |

FIG. 3C

| Metal Element Disposition | Distance (μm) | Signal Conductor L(h/m)/c(f/m) | Impedance Z0 (ohms) | % Change in Z0 (From 36.89 ohms) |
|---|---|---|---|---|
| Reference | none | 2.55E-07 1.87E-10 | 36.89 | N/A |
| Reference | 300 | 2.54E-07 1.88E-10 | 36.71 | 0.5% |
| Floating | 300 | 2.56E-07 1.87E-10 | 36.94 | -0.1% |
| Reference | 250 | 2.49E-07 1.92E-10 | 36.05 | 2.3% |
| Floating | 250 | 2.55E-07 1.87E-10 | 36.92 | -0.1% |
| Reference | 200 | 2.41E-07 1.98E-10 | 34.90 | 5.4% |
| Floating | 200 | 2.55E-07 1.87E-10 | 36.89 | 0.0% |
| Reference | 150 | 2.27E-07 2.10E-10 | 32.86 | 10.9% |
| Floating | 150 | 2.55E-07 1.88E-10 | 36.84 | 0.2% |
| Reference | 100 | 2.00E-07 2.39E-10 | 28.94 | 21.6% |
| Floating | 100 | 2.54E-07 1.88E-10 | 36.72 | 0.5% |
| Reference | 50 | 1.28E-07 3.73E-10 | 18.55 | 49.7% |
| Floating | 50 | 2.53E-07 1.89E-10 | 36.53 | 1.0% |

FIG. 4C

CONTROLLING CHARACTERISTIC IMPEDANCE OF A TRACE IN A PRINTED CIRCUIT BOARD TO COMPENSATE FOR EXTERNAL COMPONENT LOADING

BACKGROUND

1. Field of the Invention

The present invention relates to printed circuit boards and conductive traces used to carry signals within printed circuit boards.

2. Background of the Related Art

The memory system of a motherboard may include a memory controller in communication with multiple memory module connectors coupled together in a daisy chain topology where one connector is coupled to the next connector and so on. Typically, the same etch design is used throughout the memory system or network, meaning that each segment of conductive traces used to couple the memory controller and each memory module connector has the same cross-sectional dimensions. However, when the memory module connectors become populated with memory modules, the load in that portion of the memory system changes and causes the characteristic impedance in that portion to change. The impedance mismatch between the segments of the memory system can cause unwanted reflections and noise.

BRIEF SUMMARY

One embodiment of the present invention provides an apparatus comprising a multi-layer printed circuit board including a ground reference, a memory controller secured to the printed circuit board, and multiple memory module connectors secured to the printed circuit board, wherein the memory controller is coupled to the multiple memory module connectors by signal conductors embedded in a signal layer of the printed circuit board to form a daisy chain circuit, and wherein each memory module connector includes a presence pin. The apparatus further comprises a metal element disposed in a second layer of the printed circuit board and aligned with a first one of the signal conductors coupling the memory controller to a first one of the multiple memory module connectors. A control circuit having multiple inputs and an output is also provided, wherein each input is coupled to the presence pin of one of the memory module connectors. At least one relay is coupled between the ground reference and the metal element, wherein the at least one relay is controlled by the output from the control circuit, and wherein the at least one relay connects the metal element to the ground reference in response to installing a memory module into one or more of the multiple memory module connectors.

Another embodiment of the present invention provides a method comprising detecting the presence of a memory module installed in at least one of a plurality of memory module connectors, wherein installation of the memory module causes impedance in a second signal conductor in a daisy chain memory circuit to decrease. The method further comprises automatically altering the impedance of a first signal conductor of the daisy chain memory circuit to reduce a mismatch in impedance of the first signal conductor and the second signal conductor in response to detecting the presence of the memory module in the memory module connector.

BRIEF DESCRIPTION OF THE SEVERAL VIEWS OF THE DRAWINGS

FIG. 3C is a table showing data used in the preparation of the graph in FIG. 3B.

FIG. 4C is a table showing data used in the preparation of the graph in FIG. 4B.

DETAILED DESCRIPTION

Figure 1:
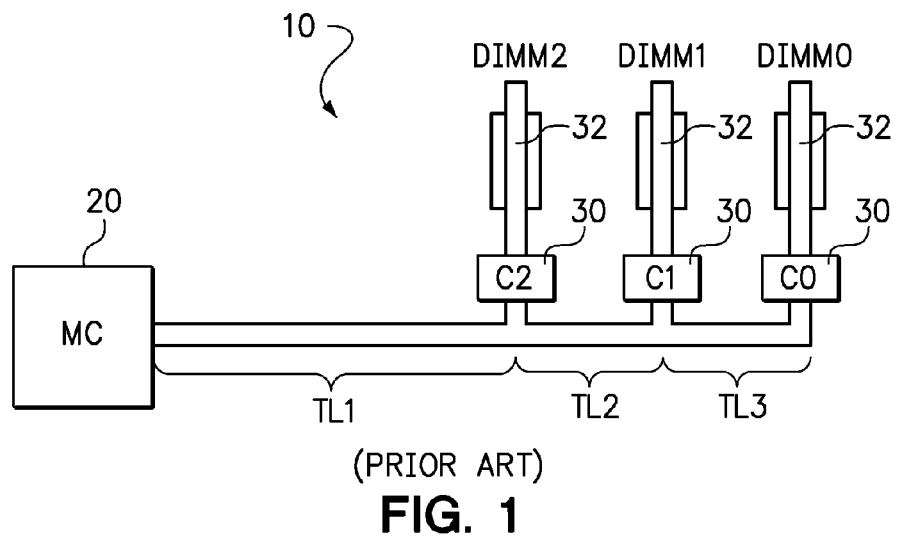
FIG. 1 is a schematic diagram of a prior art memory system having multiple connectors in a daisy chain circuit.

One embodiment of the present invention provides an apparatus comprising a multi-layer printed circuit board including a ground reference, a memory controller secured to the printed circuit board, and multiple memory module connectors secured to the printed circuit board, wherein the memory controller is coupled to the multiple memory module connectors by signal conductors embedded in a signal layer of the printed circuit board to form a daisy chain circuit, and wherein each memory module connector includes a presence pin. The apparatus further comprises a metal element disposed in a second layer of the printed circuit board and aligned with a first one of the signal conductors coupling the memory controller to a first one of the multiple memory module connectors. A control circuit having multiple inputs and an output is also provided, wherein each input is coupled to the presence pin of one of the memory module connectors. At least one relay is coupled between the ground reference and the metal element, wherein the at least one relay is controlled by the output from the control circuit, and wherein the at least one relay connects the metal element to the ground reference in response to installing a memory module into one or more of the multiple memory module connectors.

The metal element and the first of the signal conductors are separated by dielectric material with no other conductive materials disposed between the metal element and the first signal conductor. For example, the metal element may be separated from the first signal conductor by a distance from 50 µm to 300 µm. The width of the metal element may be independently selected, for example having a width that is from 50% to 100% of a width of the first signal conductor. Furthermore, the metal element and the first signal conductor are preferably both embedded within the printed circuit board. As discussed herein, the distance between the metal element and the first signal conductor and the relative width of the metal element and the first signal conductor may be determined in order to compensate for external component loading that changes the impedance in segments of the signal conductors.

The signal conductors that form the daisy chain circuit may include a second signal conductor coupling the first one of the memory module connectors to a second one of the memory module connectors, wherein installing the memory module into one or more of the multiple memory module connectors changes the impedance in the second signal conductor. Accordingly, in response to the output from the control circuit, the at least one relay connecting the metal element to the ground reference alters the impedance of the first signal conductor to reduce a mismatch between the impedance of the first signal conductor and the impedance of the second signal conductor.

The printed circuit board may further include multiple pull up resistors, wherein each pull up resistor is coupled to one of the multiple inputs to the control circuit. Furthermore, the control circuit may include an inverter or a NOR logic gate having inputs coupled to the presence pins and an output coupled to the at least one relay.

In one optional configuration, each relay has a first terminal connected to the ground reference through a first conductive via and a second terminal connected to the metal element through a second conductive via. The second conductive via is preferably isolated from the ground reference and the signal conductor by anti-pads. The use of vias allows the metal element and the ground reference to be embedded within the printed circuit board, whereas the relays may be mounted on the surface of the printed circuit board. In a preferred configuration, the at least one relay includes a first relay coupled to the metal element at a first end of the metal element, and a second relay coupled to the metal element at a second end of the metal element.

Another embodiment of the present invention provides a method of detecting the presence of a memory module installed in at least one of a plurality of memory module connectors, wherein installation of the memory module causes impedance to decrease in a second signal conductor in a daisy chain memory circuit. The method further comprises automatically altering the impedance of the first signal conductor of the daisy chain memory circuit to reduce a mismatch in impedance of the first signal conductor and the second signal conductor in response to detecting the presence of the memory module in the memory module connector. Automatically altering the impedance of a first signal conductor of the daisy chain memory circuit preferably includes connecting a metal element to a ground reference, which may include activating (closing) a relay having a first input coupled to the metal element and a second input coupled to the ground reference. Still further, connecting the metal element to the ground reference may include activating a first relay and a second relay, where each relay has a first input coupled to the metal element and a second input coupled to the ground reference. Optionally, the first relay may be coupled to the metal element at a first end of the metal element, and the second relay may be coupled to the metal element at a second end of the metal element.

Embodiments of the present invention provide a method to modify the characteristic impedance (Z0) of a selected section of a network as the loading changes in another section of the same network. The method prevents or reduces impedance discontinuity due to a variation in loading.

FIG. 1 is a schematic diagram of a prior art memory system having multiple connectors in a daisy chain circuit that uses the same etch design throughout the network. The circuit 10 includes a memory controller 20 coupled to three dual inline memory module (DIMM) connectors 30 that may each selectively receive a DIMM 32. The connections between the memory controller 20 and the individual DIMM connectors 30 are provided by conductive traces within a printed circuit board (PCB) (not specifically shown; see FIG. 2). Specifically, the daisy chained topology provides a first trace line (TL1) connecting the memory controller 20 to a first DIMM connector (C2), a second trace line (TL2) connecting the first DIMM connector (C2) to a second DIMM connector (C1), and a third trace line (TL3) connecting the second DIMM connector (C1) to a third DIMM connector (C0).

The printed circuit board (PCB) etch design provides each trace line TL1, TL2, TL3 with the same cross-sectional geometry (i.e., trace width and trace thickness). Furthermore, the three trace lines TL1, TL2 and TL3 are all located in the same layer of the PCB (see the signal layer in FIG. 2), such that each trace, or segment of the entire trace, is the same distance from ground layers. However, the trace lines TL2 and TL3 that connect the three tightly packed DIMM connectors C2, C1 and C0 are normally short, whereas the trace line TL1 from the memory controller 20 to the first connector C2 is typically a longer trace.

When the memory system has only one DIMM (DIMM0) installed in the far end connector C0, the trace lines TL1, TL2 and TL3 have the same characteristic impedance (Z0) and there are no Z0 discontinuities between trace segments. However, when other connectors are populated with DIMMs, as shown in FIG. 1, the combination of TL2 and TL3 and distributive capacitance loading of the DIMMs reduces the effective impedance of the network sections TL2 and TL3 making up the connector array. The result is the introduction of an impedance discontinuity between TL1 and the network sections TL2 and TL3 including the populated connectors.

Figure 2:
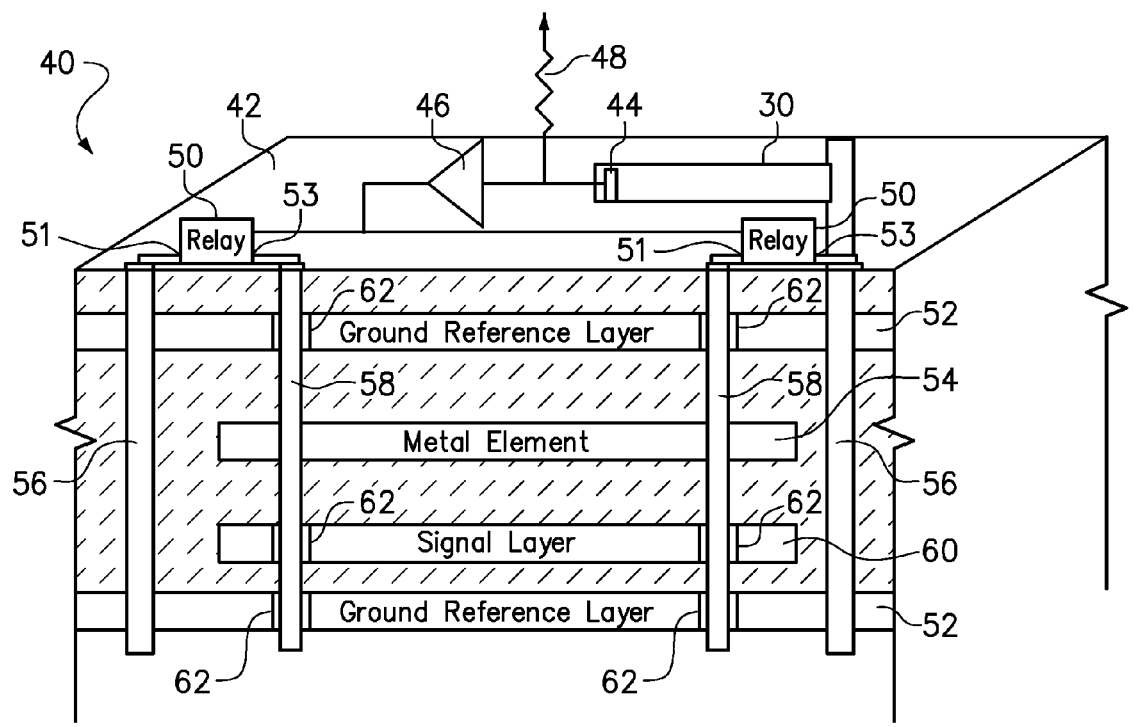
FIG. 2 is a schematic cross-sectional diagram of a printed circuit board showing implementing a simplified embodiment of the present invention.

FIG. 2 is a schematic diagram of a cross-section of the printed circuit board 40 implementing an embodiment of the present invention. A memory module connector 30 (representative of multiple memory module connectors) is secured to a top surface 42 of the printed circuit board 40 and includes a presence pin 44 coupled to an input to an inverter 46. A pull up resistor 48 is also coupled to the line, from the presence pin 44 to the inverter 46. The inverter 46 has an output coupled to first and second relays 50. Each relay 50 is coupled between a ground reference plane 52 and the metal element 54 using conductive vias. Specifically, each relay 50 has a first terminal 51 connected to the ground reference 52 through a first conductive via 56 and a second terminal 53 connected to the metal element 54 through a second conductive via 58. The second conductive via 58 is preferably isolated from the ground reference 52 and the signal conductor 60 by anti-pads 62. The use of vias allows the metal element 54 and the ground reference 52 to be embedded within the printed circuit board 40, whereas the relays 50 may be mounted on the surface 42 of the printed circuit board 40. As shown, the at least one relay 50 includes a first relay 50 coupled to the metal element 54 at or near a first end of the metal element, and a second relay 50 coupled to the metal element 54 at or near a second end of the metal element. Although a single relay may be beneficial, placing relays at both ends of the metal element creates a loop path as shown. When the relays 50 are open (circuit open), the metal element 54 is isolated or floating. When the relays 50 are closed (circuit closed), the metal element 54 is coupled to the ground reference layer 52 and is an integral part of the return path for the stripline structure and acts as a ground reference. The relays preferably have a very low "on" resistance to be able to connect the floating layer to ground potential. The control circuit shown detects the "presence" of a DIMM in the connector using the pin 44 and activates the relays to control the function of the metal element 54 to compensate for an expected variation in loading caused by the presence of the DIMM.

Figure 3A:
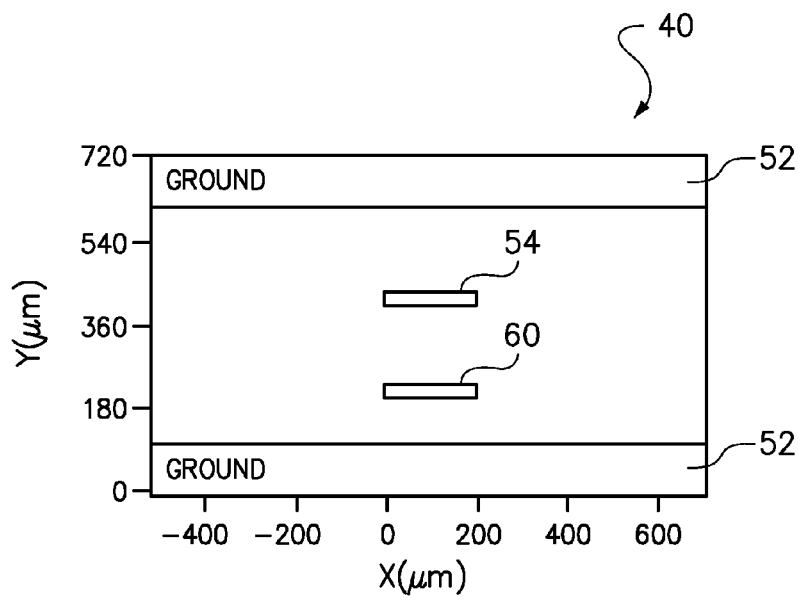
FIG. 3A is a diagram illustrating the relative position and size of a signal conductor and a first metal element in a printed circuit board.

FIG. 3A is a diagram illustrating the relative position and size of a signal conductor 60 and a first metal element 54 in a printed circuit board 40. The diagram has a Y-axis representing the distance (μm) through the thickness of the printed circuit board and an X-axis representing a distance (μm) in the plane of the printed circuit board. In FIG. 3A, the signal conductor 60 and the first metal element 54 have the same width (about 8 mils or 200 μm), are vertically aligned, and spaced apart by about 200 μm of dielectric material. Without the metal element 54 present, the signal conductor 60 has characteristic impedance Z0 of 36.89 ohms when located 100 μm (about 3.94 mils) above the closest ground reference 52 as shown in FIG. 3A.

Figure 3B:
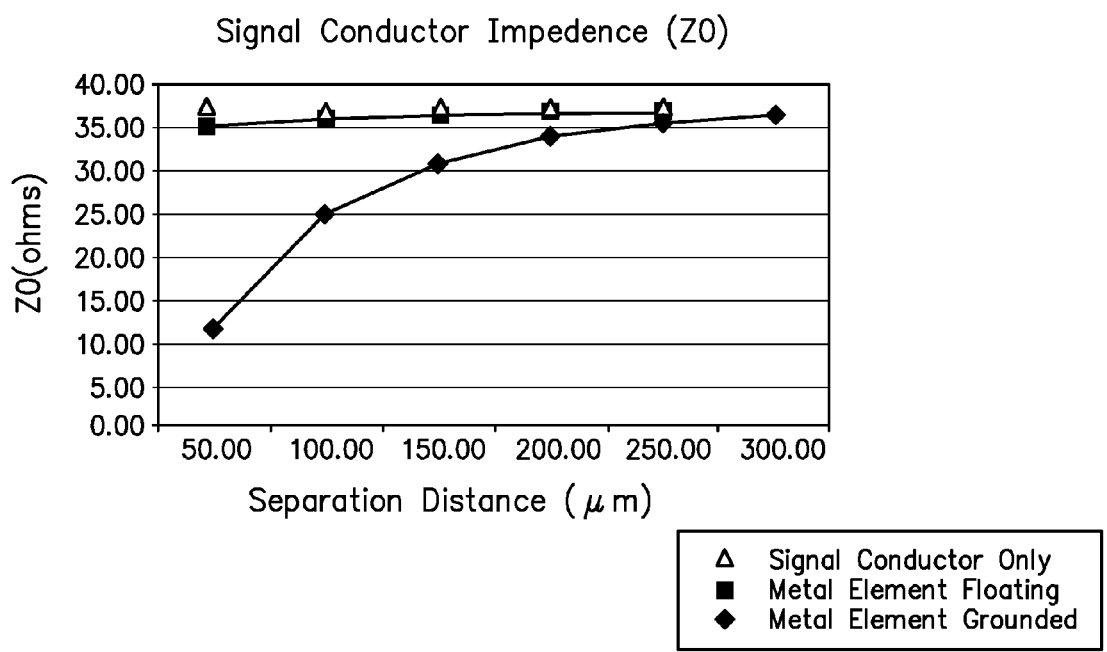
FIG. 3B is a graph of signal conductor impedance as a function of separation distance for the signal conductor and the first metal element of FIG. 3A.

FIG. 3B is a graph of signal conductor impedance as a function of separation distance for the signal conductor 60 and the first metal element 54 of FIG. 3A. The impedance of the signal conductor without a metal element present is shown as 36.89 ohms (line with triangles). In separate printed circuit boards, the metal element 54 and signal conductor 60 were spaced apart by a distance ranging from 300 μm to 50 μm and the metal element was made to function as a floating metal conductor. Accordingly, the characteristic impedance Z0 of the signal conductor was measured to have changed from the ideal 36.89 ohms (line with triangles) to a range (see line with squares) from 36.79 ohms (i.e., a 0.3% change in Z0 at 300 μm distance) to 35.13 ohms (i.e., a 4.8% change in Z0 at 50 μm distance). By contrast, when the metal element 54 and signal conductor 60 were spaced apart by a distance ranging from 300 μm to 50 μm and the metal element was made to function as a ground reference, the characteristic impedance Z0 of the signal conductor changed from the ideal 36.89 ohms (line with triangles) to a range (see line with diamonds) from 36.41 ohms (i.e., a 1.3% change in Z0 at 300 μm distance) to 11.34 ohms (i.e., a 69% change in Z0 at 50 μm distance).

Therefore, FIG. 3B demonstrates that the impedance of the signal conductor 60, or any other section of a network, can be altered using a metal element 54 positioned on a layer at a selected distance from the signal conductor, where the metal element has a selected width. For example, if the loading of memory DIMMs has been predetermined to effectively lower the characteristic impedance Z0 of the trace lines TL2 and TL3 to 31 ohms, then the data in FIG. 3B (and FIG. 3C) suggests placing a metal element on a layer that is 150 μm above the TL1 network section. When only one DIMM connector is populated (i.e., connector C0 in FIG. 1), then the mismatch in Z0 is only 0.41 ohms or 1.2% (i.e., 36.89 ohms without any DIMM connector vs. 36.48 ohm with a single DIMM) if the metal element is floating. When all of the DIMM connectors are populated as show in FIG. 1, then the Z0 in trace segments TL2 and TL3 is 31 ohms and the Z0 in the trace segment TL1 equals 30.84 ohms if the metal element is grounded. The result is that the impedance change in the trace TL1 can be controlled to more closely match the network segments TL2 and TL3 whose effective impedance was affected by a variation in loading.

FIG. 3C is a table showing data used in the preparation of the graph in FIG. 3B. The data shown in FIG. 3C was obtained via calculations, using Synopsys TxTool 2D field solver, based on the fact that the signal conductor 60 and the metal element 54 had the same width of 8 mils. Finer control of the signal conductor's characteristic impedance can be obtained by adjusting the width of the metal element relative to width of the signal conductor as shown in reference to FIGS. 4A-4C. Table 1 shows the characteristic impedance of signal conductor structures as predicted by.

Embodiments of the present invention reduce the impedance discontinuity between segments of a signal conductor trace 60, which is caused by the installation of memory modules, by introducing a metal element 54 embedded into the dielectric material of the printed circuit board a spaced distance from a signal conductor 60 segment and controlling the metal element 54 to function either as an unattached floating trace or as a ground reference. When the metal element 54 is controlled to function as an unattached floating trace, the metal element 54 is not part of the return path and not physically connected to planes 52 and the floating metal element 54 can be an electrical potential different from the ground planes 52, and the displacement current results in a charge distribution on the metal element 54. The metal element or trace is positioned in relation to the signal conductor so that the metal element will not cause a drastic change in the target impedance of the signal conductor when the metal element is functioning as an unattached floating trace. However, the metal element or trace is positioned close enough to the signal conductor so that the metal element may significantly change the signal conductor's impedance when the metal element is functioning as a ground reference.

Figure 4A:
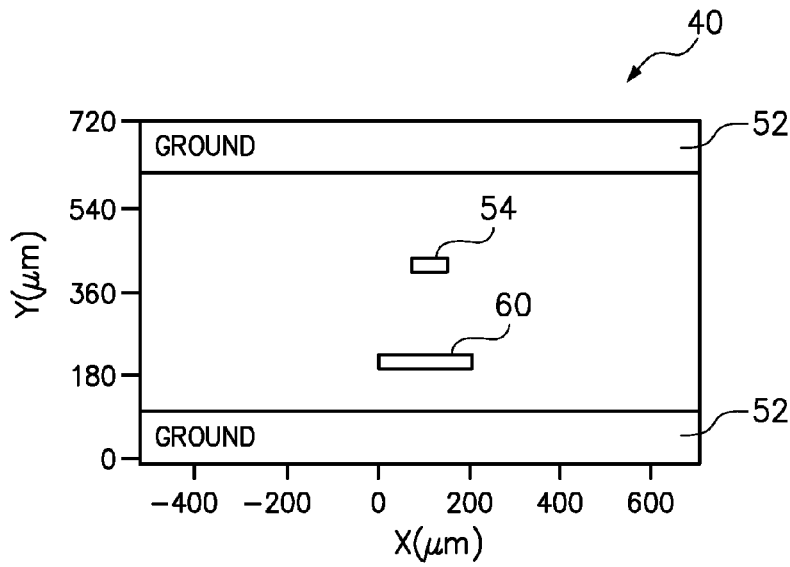
FIG. 4A is a diagram illustrating the relative position and size of a signal conductor and a second metal element in a printed circuit board.

FIG. 4A is a diagram illustrating the relative position and size of a signal conductor 60 and a second metal element 54 in a printed circuit board 40. The diagram in FIG. 4A differs from the diagram of FIG. 3A in that the second metal element 54 (FIG. 4A) has only half the width of the metal element of FIG. 3A and half the width of the signal conductor 60 in either of FIGS. 3A and 4A.

Figure 4B:
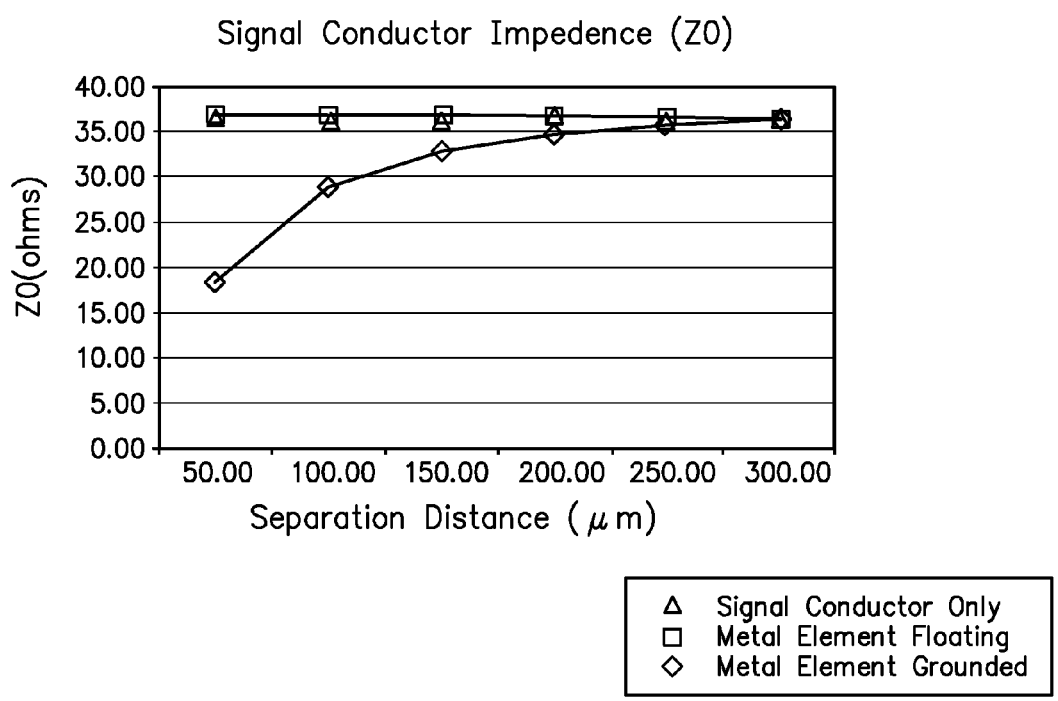
FIG. 4B is a graph of signal conductor impedance as a function of separation distance for the signal conductor and the second metal element of FIG. 4A.

FIG. 4B is a graph of signal conductor impedance as a function of separation distance for the signal conductor 60 and the second (half-width) metal element 54 of FIG. 4A. Similar to FIG. 3B, FIG. 4B demonstrates that the impedance of the signal conductor 60, or any other section of a network, can be altered using a metal element 54 positioned on a layer at a selected distance from the signal conductor, where the metal element has a selected width. Controlling the activation of the relays determines whether the metal element will function as a floating trace of a ground reference.

FIG. 4C is a table showing data used in the preparation of the graph in FIG. 4B. The data shown in FIG. 4C was obtained via calculations, using Synopsys TxTool 2D field solver, based on the fact that the metal element 54 had a width (4 mils) that was half the width of the signal conductor 60 (8 mils).

Figure 5:
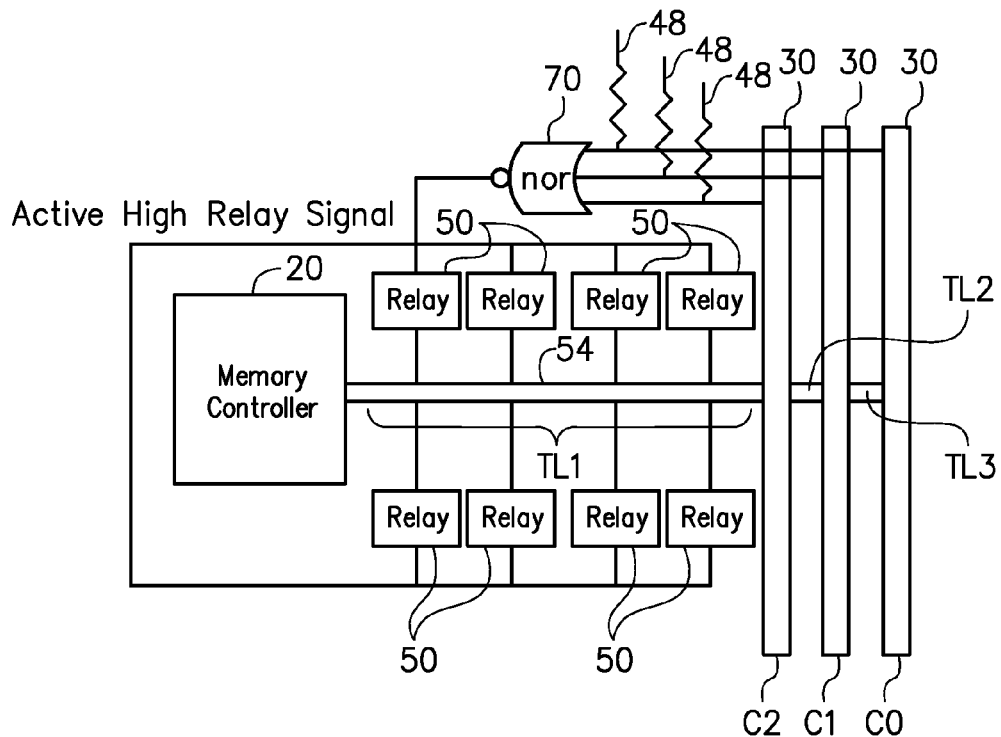
FIG. 5 is a schematic plan view of a memory system having a metal element used to alter the impedance of a trace between the memory module and a first memory module connector.

FIG. 5 is a schematic plan view of a memory system having a metal element 54 used to alter the impedance of a signal conductor between the memory controller 20 and a first memory module connector (C2) 30. The metal element 54 extends along the same path as (but a spaced distance from) the signal conductor trace line TL1. Preferably, the metal element will be coextensive with the trace line TL1 or whatever segment has an impedance that is to be controlled.

A control circuit includes a NOR gate 70 having three inputs coupled to presence pins of the three DIMM connectors (C2, C1, C0) 30. Each of the three inputs is also coupled to a separate pull up resistor 48. The output of the NOR gate 70 is coupled to multiple relays 50 that control whether the metal element 54 functions as a floating conductor or as a ground reference. Using multiple relays 50 spaced apart along the path of the metal element 54 will minimize IR drop along the length of metal element. In FIG. 5, each relay is shown being coupled to the metal element 54, and would also be coupled to a ground reference, but this is not shown in FIG. 5 (See FIG. 2).

Figure 6:
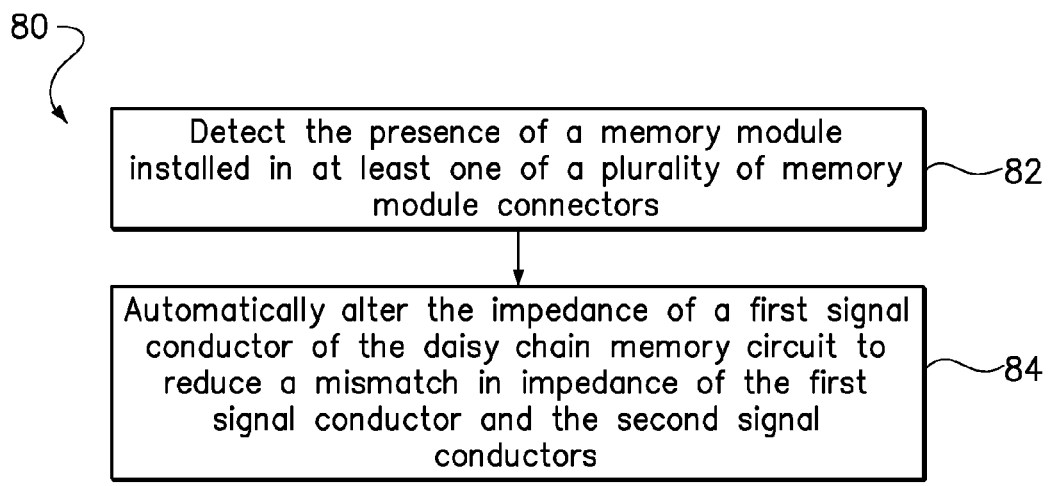
FIG. 6 is a flowchart of a method in accordance with one embodiment of the present invention.

FIG. 6 is a flowchart of a method 80 in accordance with one embodiment of the present invention. In step 82, the method detects the presence of a memory module installed in at least one of a plurality of memory module connectors, wherein installation of the memory module causes impedance in a second signal conductor in a daisy chain memory circuit to decrease. In step 84, the method automatically alters the impedance of a first signal conductor of the daisy chain memory circuit to reduce a mismatch in impedance of the first signal conductor and the second signal conductors in response to detecting the presence of the memory module in the memory module connector.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus, comprising:
    a multi-layer printed circuit board including a ground reference;
    a memory controller secured to the printed circuit board;
    multiple memory module connectors secured to the printed circuit board, wherein the memory controller is coupled to the multiple memory module connectors by signal conductors embedded in a signal layer of the printed circuit board to form a daisy chain circuit, and wherein each memory module connector includes a presence pin;
    a metal element disposed in a second layer of the printed circuit board and aligned with a first one of the signal conductors coupling the memory controller to a first one of the multiple memory module connectors;
    a control circuit having multiple inputs and an output, wherein each input is coupled to the presence pin of one of the memory module connectors; and
    at least one relay coupled between the ground reference and the metal element, wherein the at least one relay is controlled by the output from the control circuit, and wherein the at least one relay connects the metal element to the ground reference in response to installing a memory module into one or more of the multiple memory module connectors.

2. The apparatus of claim 1, wherein the metal element has a width that is from 50% to 100% of a width of the first one of the signal conductors.

3. The apparatus of claim 1, wherein the metal element is separated from the signal conductor by dielectric material, and wherein there are no other conductive materials disposed between the metal element and the signal conductor.

4. The apparatus of claim 3, wherein the metal element is separated from the signal conductor by a distance from 50 μm to 300 μm.

5. The apparatus of claim 1, wherein the signal conductors that form the daisy chain circuit include a second signal conductor coupling the first one of the memory module connectors to a second one of the memory module connectors, wherein installing the memory module into one or more of the multiple memory module connectors changes an impedance in the second signal conductor, and wherein the at least one relay connecting the metal element to the ground reference alters the impedance of the signal conductor to reduce a mismatch in the impedance of the first and second signal conductors.

6. The apparatus of claim 1, further comprising:
    multiple pull up resistors, each pull up resistor coupled to one of the multiple inputs to the control circuit.

7. The apparatus of claim 1, wherein the control circuit includes an inverter.

8. The apparatus of claim 1, wherein the control circuit include a NOR gate.

9. The apparatus of claim 1, wherein each relay has a first input connected to the ground reference through a first conductive via and a second input connected to the metal element through a second conductive via.

10. The apparatus of claim 9, wherein the second conductive via is isolated from the ground reference and the signal conductor by anti-pads.

11. The apparatus of claim 1, wherein the at least one relay includes a first relay and a second relay, wherein the first relay is coupled to the metal element at a first end of the metal element, and wherein the second relay is coupled to the metal element at a second end of the metal element.

* * * * *